(12) United States Patent
Kubota et al.

(10) Patent No.: US 9,239,086 B2
(45) Date of Patent: Jan. 19, 2016

(54) EXTERNAL CONTROL TYPE FAN CLUTCH DEVICE

(71) Applicant: USUI KOKUSAI SANGYO KAISHA LTD., Shimizu-cho, Sunto-gun, Shizuoka (JP)

(72) Inventors: Satoshi Kubota, Shimizu-cho (JP); Hiroki Sugawara, Shimizu-cho (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 14/297,836

(22) Filed: Jun. 6, 2014

(65) Prior Publication Data
US 2014/0360834 A1 Dec. 11, 2014

(30) Foreign Application Priority Data

Jun. 6, 2013 (JP) ................................. 2013-119790

(51) Int. Cl.
F16D 35/02 (2006.01)
F01P 5/04 (2006.01)
F01P 7/04 (2006.01)

(52) U.S. Cl.
CPC ................. *F16D 35/024* (2013.01); *F01P 5/04* (2013.01); *F01P 7/042* (2013.01)

(58) Field of Classification Search
CPC ..... F16D 35/024; F16D 35/02; F16D 35/021; F16D 2500/10468; F16D 2500/10487; F16D 2500/10418

USPC ........................................................ 192/58.61
See application file for complete search history.

(56) References Cited

U.S. PATENT DOCUMENTS

| 4,987,986 | A | | 1/1991 | Kennedy et al. | |
|---|---|---|---|---|---|
| 5,722,523 | A | * | 3/1998 | Martin | 192/58.61 |
| 6,915,888 | B2 | * | 7/2005 | Shiozaki et al. | 192/58.61 |
| 7,191,883 | B2 | * | 3/2007 | Angermaier | 192/58.61 |
| 2013/0037371 | A1 | * | 2/2013 | Yamada et al. | 192/58.5 |

* cited by examiner

Primary Examiner — Richard Lorence
Assistant Examiner — David Morris
(74) Attorney, Agent, or Firm — Gerald E. Hespos; Michael J. Porco; Matthew T. Hespos

(57) ABSTRACT

An external control type fan clutch device has a sealed housing with a torque transmission chamber incorporating a drive disk therein. The drive disk has an oil reserving chamber. The sealed housing is supported on a rotary shaft with the drive disk fixed thereto. A valve member (armature) controls opening and closing of an oil circulating flow passage hole provided on a side wall of the oil reserving chamber. The valve member has magnetism and is actuated by an electromagnet supported on the rotary shaft for opening or closing the oil circulating flow passage hole. A ring-like magnetic body is disposed between the electromagnet and the rotary shaft for efficiently transmitting a magnetic flux of the electromagnet to the armature of the valve member. The external control type fan clutch device achieves size reduction, weight reduction and power saving.

8 Claims, 2 Drawing Sheets

EXTERNAL CONTROL TYPE FAN CLUTCH DEVICE

CROSS REFERENCE TO RELATED APPLICATIONS

The present application claims priority to Japanese Patent Application No. 2013-119790 filed on Jun. 6, 2013, the entire contents of which are incorporated by reference herein.

TECHNICAL FIELD

The present invention generally relates to an external control type fan clutch device that controls fan rotation for cooling an engine in an automobile or the like according to a change in external ambient temperature or a rotational change.

BACKGROUND ART

Conventionally, as a fan clutch device of this type, one of a system is known in which a torque transmission chamber incorporating a drive disk therein is provided in a sealed housing composed of a nonmagnetic case and a cover mounted on the case, the case and the cover being supported via a bearing on a rotary shaft to which the drive disk is fixed; a side wall face of an oil reserving chamber formed by a hollow in the drive disk is provided with at least one oil circulating flow passage hole communicating with a torque transmission gap; a valve member having magnetism for opening or closing the oil circulating flow passage hole is provided; and rotary torque transmission from a drive side to a driven side is controlled by using an electromagnet to actuate the valve member to increase or decrease an effective contact area of oil in a torque transmission gap formed between the drive side and the driven side.

As an external control type fan clutch device of this type, one of a system in which an electromagnet fixed to a rotary shaft side is energized to actuate a valve member via an armature of the valve member mounted on a drive disk, thereby externally controlling opening and closing of a circulating flow passage. The configuration of the device employs a system in which a magnetic flux due to excitation of a coil of the electromagnet is transmitted to the armature of the valve member composed of a leaf spring through a magnetic path of the rotary shaft composed of a highly magnetic permeable magnetic material to make up a magnetic circuit (magnetic loop) for return to the electromagnet again, and then the flow rate of the torque transmission oil is controlled by actuating the valve member within the clutch device using the electromagnet (see U.S. Pat. No. 4,987,986).

The conventional external control type fan clutch device described above has a disadvantage. More particularly, since the magnetic circuit (magnetic loop) is configured utilizing the bearing supporting the electromagnet actuating the valve member on the rotary shaft, there is the problem that the magnetic circuit is too long to efficiently transmit magnetic force of the electromagnet to the armature, excessive electromagnetic force is required in order to attract the armature, the size and weight of the electromagnet is increased, the size and weight of the fan clutch device cannot be reduced, and power consumption is also increased.

The invention has been made to solve the disadvantage of the convention external control type fan clutch device described above, and the object of the invention is to provide an external control type fan clutch device where size reduction and weight reduction, and power saving are achieved in a fan clutch device.

SUMMARY OF THE INVENTION

An external control type fan clutch device according to the present invention is configured to incorporate, between an electromagnet and a rotary shaft, a ring-like magnetic body to efficiently transmit a magnetic flux of the electromagnet to an armature of a valve member. The gist of the invention lies in an externally control type fan clutch device in which a torque transmission chamber incorporating a drive disk therein is provided within a sealed housing composed of a nonmagnetic case and a cover mounted on the case, the case and the cover being supported via bearings on a rotary shaft with the drive disk fixed thereto; a side wall face of an oil reserving chamber formed by a hollow in the drive disk is provided with at least one oil circulating flow passage hole communicating with a torque transmission gap; a valve member having magnetism for opening or closing the oil circulating flow passage hole is provided, the valve member being configured to have an armature attached to a leaf spring mounted on the drive disk; an electromagnet supported via a bearing on the rotary shaft and a first ring-like magnetic body disposed on the outer periphery of the rotary shaft via a ring-like nonmagnetic body are provided; opening and closing of the oil circulating flow passage hole is controlled by the valve member actuated by the electromagnet; and rotary torque transmission from a drive side to a driven side is controlled by increasing and decreasing an effective contact area of oil in the torque transmission gap formed between the drive side and the driven side, wherein a magnetic circuit for actuation of the valve member is configured by disposing a second ring-like magnetic body adjacent to the electromagnet on the outer periphery of the rotary shaft.

In the external control type fun clutch device according to the present invention, since the second magnetic body for efficiently transmitting the magnetic flux of the electromagnet to the valve member (having an armature) is provided adjacent to the electromagnet on the outer periphery of the rotary shaft, the advantageous effect is obtained that the magnetic circuit for actuation of the valve member can be shortened so that the magnetic circuit is configured to be stable and efficient, the size reduction and weight reduction of the electromagnet can be achieved, and the power consumption can also be reduced, as compared with the conventional fan clutch device in which a magnetic circuit (magnetic loop) is configured utilizing a bearing supporting an electromagnet on a rotary shaft.

DESCRIPTION OF EMBODIMENTS

Figure 1:
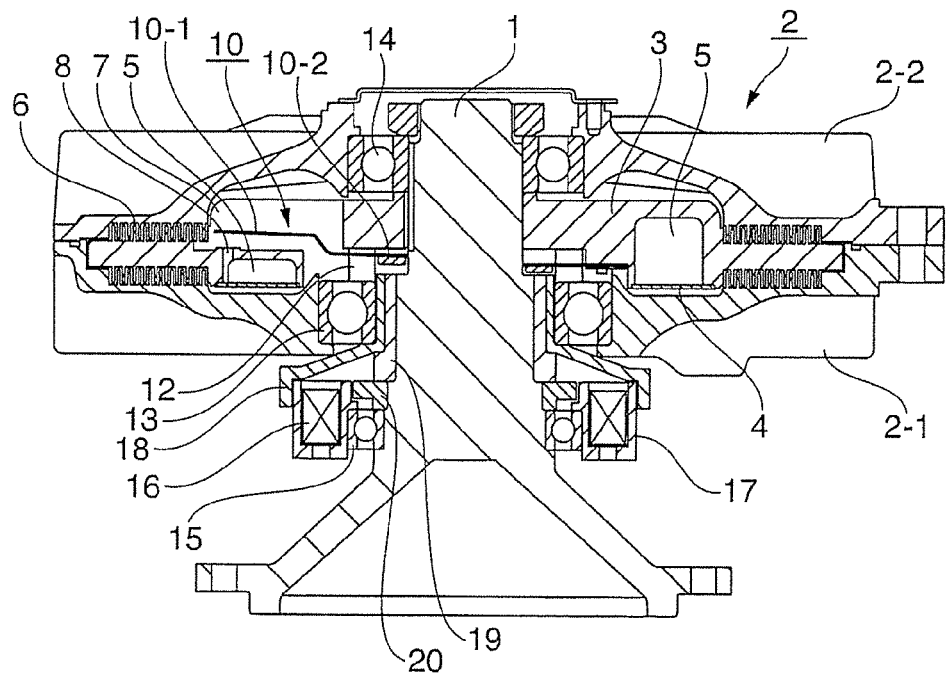
FIG. 1 is a longitudinal sectional view showing an embodiment of an external control type fan clutch device according to the present invention.
Figure 2:
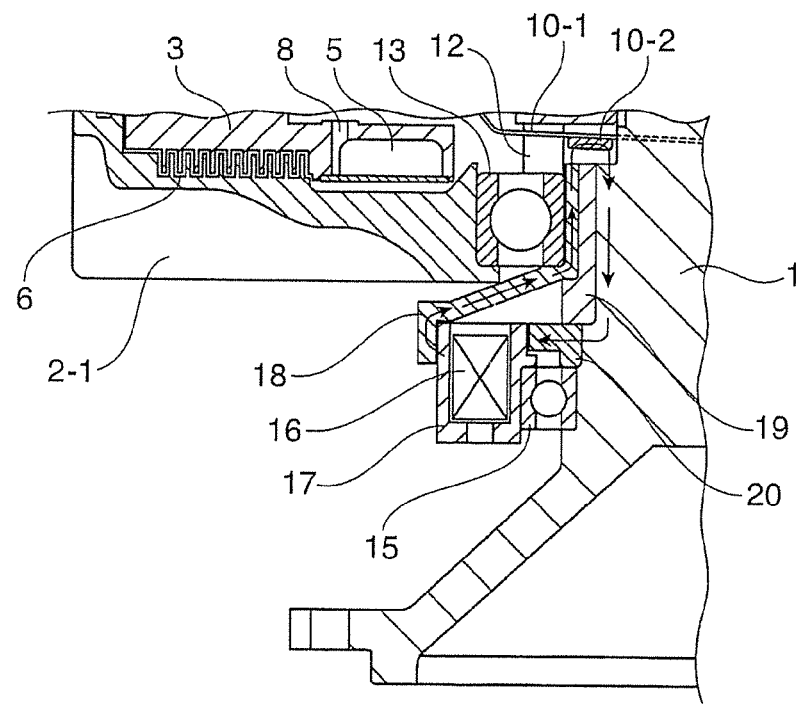
FIG. 2 is an enlarged longitudinal sectional view showing an essential part of the external control type fan clutch device according to the present invention.
Figure 3:
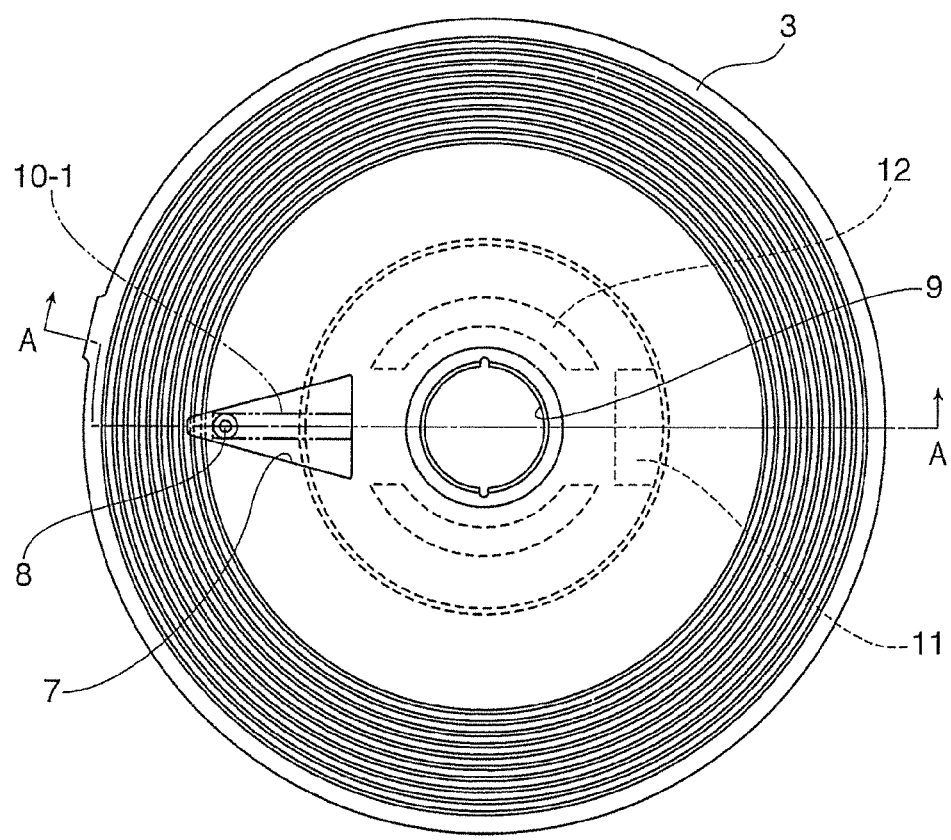
FIG. 3 is a plan view showing a drive disk of the external control type fan clutch device according to the present invention.
Figure 4:
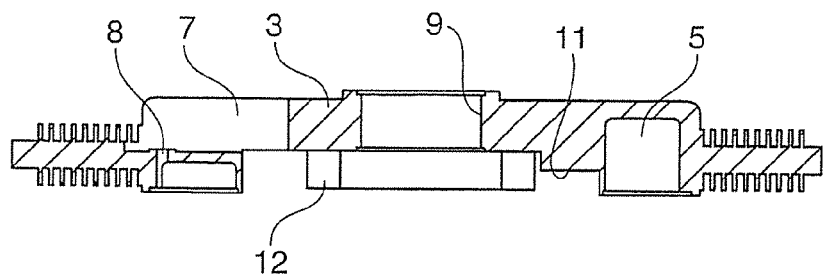
FIG. 4 is a longitudinal sectional view taken along a line A-A in FIG. 3.

In an external control type fan clutch device shown in FIGS. 1 to 4, a sealed housing 2 composed of a case 2-1 and a cover 2-2 is supported via bearings 13 and 14 on a rotary shaft (drive shaft) 1 rotated by driving of a drive unit (engine), and a drive disk 3 fixed to the rotary shaft 1 is incorporated in a torque transmission chamber 6 within the sealed housing 2. In the drive disk 3, as shown in FIGS. 3 and 4, a substantially triangular window hole 7 communicating with the torque transmission chamber 6 is provided in an end of an oil reserving chamber 5 formed by hollowing the inside of the drive disk 3, at least one oil circulating flow passage hole 8 communicating with a torque transmission gap is provided in a side wall of the oil reserving chamber 5 on an end side of the window hole 7, and further a mounting portion 11 (described later) for a valve member 10 is provided in a reverse side of the disk on the opposite side to the substantially triangular window hole 7, and arc-like disk supporting legs 12 are provided to protrude outside a shaft hole 9 in the center of the disk and face each other concentrically with the shaft hole 9, and the arc-like disk supporting legs 12 are fixed to the rotary shaft 1 between the bearings 13 and 14 supporting the sealed housing 2 on the rotary shaft 1. In the drawings, the reference numeral 4 denotes a separate plate.

The valve member 10 for feeding oil, which opens or closes the oil circulating flow passage hole 8 provided in the drive disk 3, is composed of a leaf spring 10-1 and an armature 10-2, and a proximal end of the leaf spring 10-1 is screwed or fixed to the mounting portion 11 provided in the reverse side of the disk such that the armature 10-2 of the valve member is positioned in the vicinity of the rotary shaft 1. Obviously, the leaf spring 10-1 of the valve member 10 on the opposite side to the proximal end is exposed to the cover 2-2 side through the substantially triangular window hole 7 provided in the drive disk 3, and a distal end thereof is positioned so as to face the oil circulating flow passage hole 8.

On the other hand, on the drive unit side of the sealed housing 2, a ring-like electromagnet 16 is supported on a ring-like electromagnet support 17 supported on the rotary shaft 1 via a bearing 15, a first magnetic ring 18 is disposed on the outer periphery of a cylindrical nonmagnetic ring 19 fixed to the outer periphery of the rotary shaft 1 between the electromagnet 16 and the valve member 10, and further a second magnetic ring 20 is externally fitted on the rotary shaft 1 between the electromagnet support 17 of the electromagnet 16 and the rotary shaft 1 so as to be substantially in contact with the electromagnet support 17. That is, in the present invention, in order to efficiently transmit the magnetic flux of the electromagnet 16 to the armature 10-2 of the valve member, an actuation mechanism (magnetic circuit) of the valve member 10 is constituted with the second magnetic ring 20 to be further added.

In the fan clutch device thus constituted, when the electromagnet 16 is turned off (unexcited), the oil circulating flow passage hole 8 is opened by separating the armature 10-2 from the oil circulating flow passage hole 8 of the drive disk 3 by the action of the leaf spring 10-1, and the oil reserving chamber 5 and the torque transmission chamber 6 are caused to communicate with each other so that oil in the oil reserving chamber 5 is fed to the torque transmission chamber 6, and, on the other hand, when the electromagnet 16 is turned on (excited), the oil circulating flow passage hole 8 is closed by attracting the armature 10-2 against the leaf spring 10-1 and bringing the leaf spring 10-1 into pressure contact with the drive disk 3 so that the oil in the oil reserving chamber 5 is not fed to the torque transmission chamber 6.

That is, in the present invention, since the magnetic circuit is composed of the electromagnet 16, the first magnetic ring 18, the armature 10-2, the rotary shaft 1, and the second magnetic ring 20, as described above, when the electromagnet 16 is turned on (excited), the magnetic flux flows through the electromagnet 16→the first magnetic ring 18→the armature 10-2→the rotary shaft 1→the second magnetic ring 20 in this order, so that the magnetic flux of the electromagnet 16 is efficiently transmitted to the armature 10-2 of the valve member 10, which results in such an advantageous effect that not only power consumption can be reduced but also the size reduction and weight reduction of the electromagnet 16 can be achieved.

LIST OF REFERENCE NUMBERS 1 rotary shaft
2 sealed housing
2-1 case
2-2 cover
3 drive disk
4 separate plate
5 oil reserving chamber
6 torque transmission chamber
7 window hole
8 oil circulating flow passage hole
9 shaft hole
10 valve member
10-1 leaf spring
10-2 armature
11 mounting portion
12 disk supporting leg
13 bearing
14 bearing
15 bearing
16 electromagnet
17 electromagnet support
18 first magnetic ring
19 nonmagnetic ring
20 second magnetic ring

What is claimed is:

1. An externally control type fan clutch device, the device comprising:
    a torque transmission chamber incorporating a drive disk therein and provided within a sealed housing composed of a nonmagnetic case and a cover mounted on the case, the case and the cover being supported via first and second bearings on a rotary shaft with the drive disk fixed thereto;
    at least one oil circulating flow passage hole communicating with a torque transmission gap and provided on a side wall of an oil reserving chamber formed by a hollow in the drive disk;
    a valve member opening or closing the oil circulating flow passage hole, the valve member having a magnetic armature and being attached to the drive disk;
    an electromagnet supported on the rotary shaft via a third bearing;
    a ring-like nonmagnetic body supported on the outer periphery of the rotary shaft; and
    a first ring-like magnetic body disposed on the outer periphery of the ring-like nonmagnetic body,
    wherein the first bearing is mounted on the first ring-like magnetic body and the case is mounted on the first bearing,
    wherein opening and closing of the oil circulating flow passage hole is controlled by the valve member actuated by the electromagnet, and rotary torque transmission from a drive side to a driven side is controlled by increasing and decreasing an effective contact area of oil in the torque transmission gap formed between the drive side and the driven side, wherein a second ring-like magnetic body is disposed adjacent to the electromagnet on the outer periphery of the rotary shaft to configure a magnetic circuit for actuation of the valve member.

2. The externally control type fan clutch device of claim 1, wherein the torque transmission gap is formed in the torque transmission chamber between the case and the drive disk, and wherein the oil reserving chamber is formed by a hollowing inside the drive disk, the at least one oil circulating flow passage hole being formed through the drive disk to provide communication between the oil reserving chamber and the torque transmission gap.

3. The externally control type fan clutch device of claim 1, wherein the electromagnet has opposite inner and outer circumferential surfaces, at least part of the first ring-like magnetic body being opposed to the outer circumferential surface of the electromagnet, and at least part of the second ring-like magnetic body being opposed to the inner circumferential surface of the electromagnet.

4. The externally control type fan clutch device of claim 1, wherein the magnetic circuit is comprised of the electromagnet, the first ring-like magnetic body, the armature, the rotary shaft and the second ring-like magnetic body.

5. An externally control type fan clutch device, comprising:
a rotary shaft;
a ring-like nonmagnetic body supported on an outer periphery of the rotary shaft;
a first ring-like magnetic body disposed on an outer periphery of the ring-like nonmagnetic body;
a sealed housing that includes a nonmagnetic case and a cover, the sealed housing being mounted rotatably relative to the rotary shaft via at least a first bearing mounted on the outer periphery of the first ring-like magnetic body and a second bearing on the outer periphery of the rotary shaft, a torque transmission chamber being formed in the sealed housing;
a drive disk mounted fixedly on the rotary shaft and disposed in the torque transmission chamber so that a torque transmission gap is formed between the drive disk and the torque transmission chamber, an oil reserving chamber formed by a hollow in the drive disk;
at least one oil circulating flow passage hole formed in the drive disk and providing communication between the oil reserving chamber and the torque transmission gap;
a valve member attached to the drive disk and configured for opening or closing the oil circulating flow passage hole, the valve member having a magnetic armature;
an electromagnet supported on the rotary shaft via a third bearing;
wherein opening and closing of the oil circulating flow passage hole is controlled by the valve member actuated by the electromagnet, and rotary torque transmission from the rotary shaft to the sealed housing is controlled by increasing and decreasing an effective contact area of oil in the torque transmission gap, and
wherein a second ring-like magnetic body is disposed adjacent to the electromagnet on the outer periphery of the rotary shaft to configure a magnetic circuit for actuation of the valve member.

6. The externally control type fan clutch device of claim 5, wherein the valve member comprises a leaf spring for selectively opening and closing the oil circulating flow passage hole and an armature at least partly aligned axially with the first and second ring-like magnetic bodies.

7. The externally control type fan clutch device of claim 6, wherein the electromagnet has opposite inner and outer circumferential surfaces, at least part of the first ring-like magnetic body being opposed to the outer circumferential surface of the electromagnet, and at least part of the second ring-like magnetic body being opposed to the inner circumferential surface of the electromagnet.

8. The externally control type fan clutch device of claim 6, wherein the magnetic circuit is comprised of the electromagnet, the first ring-like magnetic body, the armature, the rotary shaft and the second ring-like magnetic body.

* * * * *